W. LEIGHTON, Jr.
Hollow Pressed Glass Ware.
No. 159,519.
Patented Feb. 9, 1875.
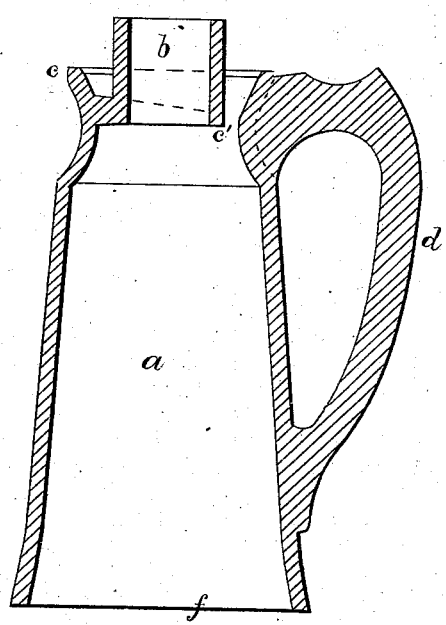
Fig. 1.
Fig. 2.
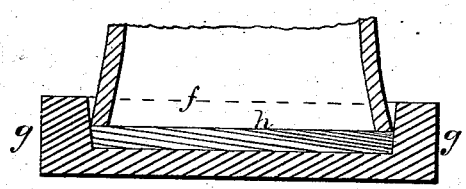
Witnesses: Chas G. Page, Claudius L. Parker.
Inventor: William Leighton Jr. by George H. Christy his Atty.

UNITED STATES PATENT OFFICE.

WILLIAM LEIGHTON, JR., OF WHEELING, WEST VIRGINIA.

IMPROVEMENT IN HOLLOW PRESSED GLASSWARE.

Specification forming part of Letters Patent No. 159,519, dated February 9, 1875; application filed January 13, 1875.

*To all whom it may concern:*

Be it known that I, WILLIAM LEIGHTON, Jr, of Wheeling, county of Ohio, State of West Virginia, have invented or discovered a new and useful Improvement in Making Bottoms of Hollow Pressed Glassware; and I do hereby declare the following to be a full, clear, concise, and exact description thereof, reference being had to the accompanying drawing making a part of this specification, in which like letters indicate like parts.

Figure 1 is a sectional elevation of the glass body and upper part of a glass molasses-pitcher, showing the open bottom as formed in the operation of pressing. Fig. 2 is a sectional view of the mold, in which the bottom is formed, and illustrating the manner of uniting the body and bottom.

My improvement, while applicable to making bottoms for hollow articles of pressed glassware generally, is especially designed for use in connection with those articles in which the mouth or upper part or body is of such shape that they can be pressed successfully only from the bottom.

This is the case in the pitcher shown, where *a* represents the body; *b*, the pouring-spout; *c*, the drip-cup; *c'*, the drip opening, and *d* the handle. This article is pressed in suitably-shaped molds, bottom up, so that the bottom is made open, as at *f*. To make and attach a bottom, I use a shallow mold, *g*, with a cavity preferably a little deeper than the thickness of the bottom required, and with a periphery corresponding to that of the lower open end of the body *a*. Into this mold I drop a quantity of very hot glass, sufficient to form the bottom desired, flatten it down to a thickness, uniform, or nearly so, as shown at *h*, either by a plunger, or preferably by touching it lightly and smoothing it down with a piece of wood or light metal, and while still sufficiently plastic to yield to pressure and form a fused joint I place the lower open end *f* of the pitcher thereon, taking care to see that it stands vertical, and then press it well down. The sides of the mold *g* act as a guide to center it properly. The pitcher, however, when thus put onto the bottom, should be sufficiently heated to co-operate with the bottom in forming a fused joint; but for this purpose the heat retained after pressing, and on removal from the mold, will commonly suffice. The joint thus formed may, if desired, be finished up by reheating and hand manipulation, in the manner ordinarily practiced in the art.

What I claim as new, and desire to secure by Letters Patent, is—

The mode of making and attaching bottoms to hollow pressed articles of glassware by forming the bottom separately in a mold, and uniting the open lower end of the article thereto by a fused joint or union, substantially as set forth.

In testimony whereof I have hereunto set my hand.

WILLIAM LEIGHTON, JR.

Witnesses:
CHAS. M. BRADY,
LUCIEN B. MARTIN.